Patented Nov. 17, 1925.

1,562,330

UNITED STATES PATENT OFFICE.

GLEN V. IRELAND, OF MILES CITY, MONTANA.

WELDING, BRAZING, AND TEMPERING COMPOUND.

No Drawing. Application filed June 17, 1925. Serial No. 37,862.

*To all whom it may concern:*

Be it known that GLEN V. IRELAND, a citizen of the United States, residing at Miles City, in the county of Custer and State of Montana, has invented certain new and useful Improvements in a Welding, Brazing, and Tempering Compound, of which the following is a specification.

My invention relates to a new composition of matter in the form of a flux for use in welding, tempering and brazing. It is adapted for welding high and low carbon steels, irons of all kinds, the brazing of cast iron or cast steel with brass or copper and the general welding of metal of the same or different kinds.

My compound is particularly adapted for use in connection with welds made in blacksmiths' fires. By its use, the operation of welding high speed steel and low carbon steel is rendered easy of accomplishment.

In welding with the acetylene torch, the compound acts as a flux for all metals such as cast iron, brass, copper, steel, cast steel, bronze and aluminum. In the use of my flux, the weld of these metals will be found to be free from impurities and very ductile, rendering the weld easily machined. Furthermore the use of my compound with the acetylene torch results in the formation of no harmful gases; it causes the impurities or dirt to come to the surface and leaves no blow holes or pits in the metal. I have found, also, that in the use of my flux with the acetylene torch, there is no tendency to carbonize the metal at the weld nor to cause excessive oxidation, with the result that the weld is strong and tough.

My compound also has an important use in connection with the tempering of steel and the restoring of burned steel to its natural state. I find that in the use of my compound, the steel can be heated to a much higher degree than heretofore thought possible with the result that there is a better absorption of the compound and a more effective tempering throughout.

In the forging and tempering of steel for chisels and cutters, I take tool steel and heat it to a high degree, that is from 1400 F. to 1800 F. and the compound applied immediately upon withdrawal from the fire. It is then forged into shape and subject to a second heating. After withdrawal from the fire an additional quantity of flux is applied to the heated portion and it is dipped in water or oil. Thereafter the temper is drawn to a copper or purple color. Generally chisels treated in this manner will withstand harder use than when treated according to any known process. Without the use of the flux of my invention the steel would be completely ruined after heating to the high degree mentioned.

The flux and tempering compound of my invention is composed of the following materials, the proportions being by weight;

Powdered borax, 85 parts; carbonate of iron (commercial), 12½ parts; bicarbonate of soda (commercial), 2½ parts.

These ingredients are thoroughly mixed and applied as described.

The borax and bicarbonate of soda enable the use of a high degree of heat in the welding of steel and cause a good flux to run off the steel, at the same time keeping the impurities in the coal and coke from entering the steel or adhering to the parts that are to be welded. The carbonate of iron restores the properties that have been removed from the steel by excessive heat and in that connection it will be noted that I recommend the use of commercial carbonate of iron, this being preferred to the saccharated or sub-carbonate of iron, each of which has a different effect. My flux when properly prepared is a bright red; the use of the sub-carbonate results in a flux of a brownish color, while the saccharated iron results in a grayish white color.

I have made numerous experiments with different compounds including iron oxide and carbonate of soda, together with different proportions of the specified ingredients, without satisfactory results.

The important advance secured by the use of my compound is in the greater ease in the making of welds with all kinds of metal, the lack of necessity for absolute accuracy in the amount of heat applied, and the restoration of the metal to its normal condition, regardless of the amount of heat applied. By its use copper may be welded to tool steel in an ordinary coal fire, and this, I believe has never before been accomplished.

Welding operations are much simplified due to the lack of necessity of maintaining a clean fire and the assurance of uniform results under all ordinary operating conditions. While the flux is of particular value in connection with blacksmith welding, it may be used to advantage in any other metallic operations. In the specification and in the appended claims I have specified certain proportions of the various ingredients, but it will be understood that advantageous results may be secured in the use of a mixture in which the proportions are somewhat varied. It is therefore intended that the claims shall be construed with that understanding.

I claim:

1. A welding and tempering flux in the form of a dry mixture of powdered borax, 85 parts, carbonate of iron, 12½ parts and bicarbonate of soda, 2½ parts.

2. A new composition of matter for use in welding, brazing and tempering, consisting of powdered borax, 85 parts, commercial carbonate of iron, 12½ parts, commercial bicarbonate of soda, 2½ parts.

In testimony whereof I have affixed my signature.

GLEN V. IRELAND.